(12) United States Patent
Griffin, Jr. et al.

(10) Patent No.: US 9,970,562 B2
(45) Date of Patent: May 15, 2018

(54) FLUID CONTROL DEVICES INCLUDING SELF-HEALING MATERIALS AND RELATED METHODS

(71) Applicant: Emerson Process Management Regulator Technologies, Inc., McKinney, TX (US)

(72) Inventors: James Lyman Griffin, Jr., McKinney, TX (US); Kunrong Matthews, Carrollton, TX (US)

(73) Assignee: EMERSON PROCESS MANAGEMENT REGULATOR TECHNOLOGIES, INC, McKinney, TX (US)

(*) Notice: Subject to any disclaimer, the term of this patent is extended or adjusted under 35 U.S.C. 154(b) by 111 days.

(21) Appl. No.: 14/335,590

(22) Filed: Jul. 18, 2014

(65) Prior Publication Data

US 2015/0300514 A1    Oct. 22, 2015

Related U.S. Application Data

(60) Provisional application No. 61/982,716, filed on Apr. 22, 2014.

(51) Int. Cl.
*F16K 25/00* (2006.01)
*F16K 1/42* (2006.01)
(Continued)

(52) U.S. Cl.
CPC ............ *F16K 25/005* (2013.01); *C08L 75/02* (2013.01); *C08L 75/04* (2013.01); *F16K 1/34* (2013.01); *F16K 1/42* (2013.01)

(58) Field of Classification Search
CPC . F16K 25/005; F16K 1/34; F16K 1/42; C08G 18/00
(Continued)

(56) References Cited

U.S. PATENT DOCUMENTS 47,309 A * 4/1865 Jenkins .................. F16K 1/487
251/357
485,984 A * 11/1892 Randall .................. F16K 1/487
251/357
(Continued)

FOREIGN PATENT DOCUMENTS

EP  2597110      5/2013
FR  1087280 A *  2/1955  ............. F16K 1/487
(Continued)

OTHER PUBLICATIONS

Martin et al., "Room temperature self-healing power of silicone elastomers having silver nanoparticles as crosslinkers," Chem. Commun., The Royal Society of Chemistry, Mar. 2012, vol. 48, p. 8255-8257, 3 pages.
(Continued)

*Primary Examiner* — Marina Tietjen
(74) *Attorney, Agent, or Firm* — Hanley, Flight & Zimmerman, LLC

(57) ABSTRACT

Fluid control devices including self-healing materials and related methods are disclosed. An example apparatus includes a valve body, a seat ring; a plug movable relative to the seat ring to control fluid flow through the valve body and a self-healing material on one of the plug or the seat ring. The self-healing material to self-heal without an external stimulus.

28 Claims, 5 Drawing Sheets

(51) Int. Cl.
*F16K 1/34* (2006.01)
*C08L 75/02* (2006.01)
*C08L 75/04* (2006.01)

(58) Field of Classification Search
USPC .................................................. 251/368, 359
See application file for complete search history.

(56) References Cited

U.S. PATENT DOCUMENTS

| | | | | |
|---|---|---|---|---|
| 1,364,848 A | * | 1/1921 | Walsh | F16K 1/427 |
| | | | | 251/142 |
| 2,322,139 A | * | 6/1943 | Kaelin | F16K 1/427 |
| | | | | 137/515.3 |
| 2,573,623 A | * | 10/1951 | Stover | F16K 1/36 |
| | | | | 251/85 |
| 2,695,032 A | * | 11/1954 | Kmiecik | F16K 17/044 |
| | | | | 137/469 |
| 2,959,392 A | * | 11/1960 | Von Platen | F16K 1/422 |
| | | | | 251/332 |
| 2,969,218 A | * | 1/1961 | Shaw | F16K 1/36 |
| | | | | 251/333 |
| 3,063,467 A | * | 11/1962 | Roberts, Jr. | F16K 1/465 |
| | | | | 137/516.29 |
| 3,284,046 A | * | 11/1966 | Allenbaugh | F16K 5/0684 |
| | | | | 251/315.08 |
| 3,508,573 A | * | 4/1970 | Smith | F16K 3/12 |
| | | | | 137/375 |
| 3,529,622 A | * | 9/1970 | Ligh | F16K 31/1266 |
| | | | | 137/329.02 |
| 3,610,575 A | * | 10/1971 | Yoneda | F16K 5/0673 |
| | | | | 251/315.05 |
| 4,015,815 A | * | 4/1977 | Leisner | F16K 1/34 |
| | | | | 251/171 |
| 4,911,403 A | * | 3/1990 | Lockwood, Jr. | F16K 1/305 |
| | | | | 137/516.29 |
| 5,052,435 A | * | 10/1991 | Crudup | F16K 15/063 |
| | | | | 137/516.29 |
| 5,345,965 A | | 9/1994 | Blume | |
| 5,642,751 A | * | 7/1997 | Crawley | B65D 90/582 |
| | | | | 137/340 |
| 5,878,993 A | * | 3/1999 | St. Germain | F16K 1/443 |
| | | | | 251/189 |
| 7,513,270 B2 | * | 4/2009 | Martin | F16K 17/0426 |
| | | | | 137/469 |
| 2006/0071193 A1 | * | 4/2006 | Kobayashi | F16K 1/385 |
| | | | | 251/333 |
| 2006/0172074 A1 | | 8/2006 | DiLoreto | |
| 2013/0205986 A1 | | 8/2013 | Rampen et al. | |
| 2014/0371362 A1 | * | 12/2014 | Wilson | C09J 167/08 |
| | | | | 524/287 |

FOREIGN PATENT DOCUMENTS

| | | | | |
|---|---|---|---|---|
| FR | 1235982 A | * | 7/1960 | ............. F16K 1/427 |
| GB | 753854 A | * | 8/1956 | ............. F16K 1/427 |
| GB | 2491204 | | 11/2012 | |
| WO | 9942912 | | 8/1999 | |
| WO | 0131239 | | 5/2001 | |
| WO | 2006037026 | | 4/2006 | |
| WO | 2008121419 | | 10/2008 | |
| WO | 2013079469 | | 6/2013 | |

OTHER PUBLICATIONS

Polly Wilson, "Polymer regenerates all by itself," Royal Society of Chemistry, News Release, Sep. 13, 2013, http://www.rsc.org/chemistryworld/2013/09/polymer-regenerates-elastomer-heals-independently, accessed on Jul. 18, 2014, 1 page.

Patent Cooperation Treaty, "International Search Report," issued in connection with PCT Patent Application No. PCT/US2015/026992, dated Jul. 22, 2015, 5 pages.

Patent Cooperation Treaty, "Written Opinion," issued in connection with PCT Patent Application No. PCT/US2015/026992, dated Jul. 22, 2015, 7 pages.

Patent Cooperation Treaty, "International Preliminary Report on Patentability," issued in connection with PCT Patent Application No. PCT/US2015/026992, dated Oct. 25, 2016, 8 pages.

\* cited by examiner

FLUID CONTROL DEVICES INCLUDING SELF-HEALING MATERIALS AND RELATED METHODS

RELATED APPLICATION

This patent claims priority to U.S. Provisional Patent Application No. 61/982,716, filed Apr. 22, 2014, which is hereby incorporated herein by reference in its entirety.

FIELD OF THE DISCLOSURE

This disclosure relates generally to fluid control devices and, more particularly, to fluid control devices including self-healing materials and related methods.

BACKGROUND

Valves include plugs that engage seats to control fluid flow through the valve. The engagement between the plug and the seat may cause damage to the seat over time. In some examples, the seat becomes relatively soft when the valve operates at higher temperatures and relatively hard when the valve operates at lower temperatures.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The examples disclosed herein relate to fluid control devices that provide high shut-off performance over a wide range of temperatures (e.g., −50° F.-200° F.). Some fluid control devices include, for example, valves (e.g., ball valves, disc valves, gate valves, etc.), fluid regulators, actuators, controllers, etc. In warmer operating temperatures, a seat of these fluid control devices may become relatively soft and, in colder operating temperatures, the seat of these fluid control devices may become relatively hard. Improved shut-off performance can be obtained at lower temperatures if a plug and/or ring has a sharp engagement edge to engage a seat. However, at warmer operating temperatures at which the seat becomes relatively soft, such a sharp engagement edge may cut or otherwise damage the seat, thereby resulting in increased maintenance and/or decreased shut-off performance.

In accordance with the teachings of this disclosure, a valve seat may include or be composed of a self-healing thermoset material and/or a self-healing polyurea material that enables damage such as cuts to be repaired at room temperature without an external stimulus (e.g., pressure, heat, catalyst, etc.). Thus, a flow control element such as a plug having a relatively sharp engagement edge can be used to provide improved shut-off performance at lower operating temperatures and any damage (e.g., cuts) imparted to the valve seat by the sharp engagement edge at, for example, higher operating temperatures can self-heal as a result of the material properties of the seat.

In some examples, depending on the flow direction of the fluid control device (e.g., flow-to-close, flow-to-open), the self-healing thermoset material may be positioned on the seat ring or on the plug. In some examples, the self-healing thermoset material may be applied as a coating and/or may make up a portion of (e.g., a layer) or the entire seat. While the above example describes the self-healing thermoset material as being included on the seat (e.g., on the plug, on the seat ring), the self-healing thermoset material may be used for different fluid control device applications. For example, the self-healing thermoset material may be used to improve the appearance of the fluid control device by providing a coating and/or barrier between the fluid control device and the environment for corrosion prevention and/or erosion prevention. Additionally or alternatively, the self-healing thermoset material may be used as a self-healing adhesive, etc.

Figure 1:
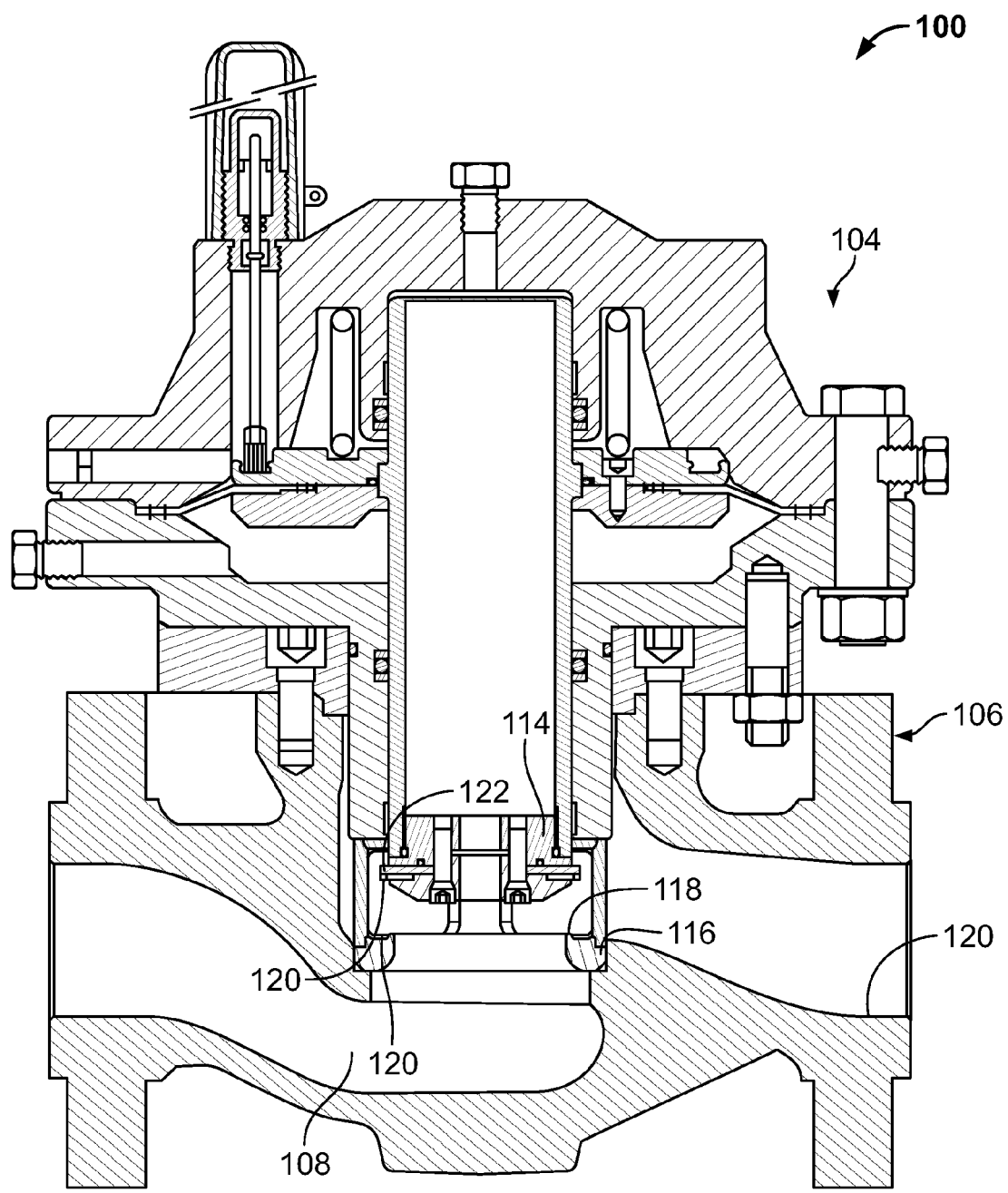
FIG. 1 shows an example fluid regulator in which the examples disclosed herein can be implemented.

FIG. 1 shows an example fluid regulator 100 including an actuator 104 coupled to a valve 106. To control fluid flow through a passageway 108 of the valve 106, the actuator 104 moves a plug 114 relative to a seat ring 116.

To provide tight shut-off at colder temperatures in a flow-to-open configuration, the seat ring 116 may have an engagement edge 118 that is relatively sharp. However, this relatively sharp engagement edge 118 may cut the plug 114 if, for example, the fluid regulator 100 is operated at warmer temperatures because the material of the plug 114 softens as the temperature increases. In some examples, the plug 114 includes a self-healing thermoset material 120 that enables any cuts caused by the engagement between the plug 114 and the seat ring 116 to be repaired at room temperature without an external stimulus (e.g., pressure, heat, catalyst, etc.). The self-healing thermoset material 120 may be a permanently cross-linked poly(Erea-Urethane) elastomeric material or any other self-healing elastomer. Formula 1 below shows an example of a major function group that can be used to implement the self-healing thermoset material 120 where R and R' are a number of $CH_2$ (methylene) and are organic groups.

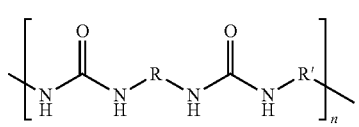

Formula 1

To substantially ensure that the self-healing thermoset material 120 remains coupled to the plug 114, a barrier may be formed on the plug 114 that prevents a suction force within the valve 106 from decoupling the self-healing thermoset material 120 from the plug 114. In some examples, the plug 114 defines a channel into which the self-healing thermoset material 120 is positioned (e.g., partially positioned, entirely positioned) to substantially prevent the self-healing thermoset material 120 from being affected by, for example, fluid flowing through the valve 106. Additionally or alternatively, to substantially ensure that the self-healing thermoset material 120 remains coupled to the plug 114, the self-healing thermoset material 120 may be glued, clamped or otherwise coupled to the plug 114.

In some examples, the self-healing thermoset material 120 is a coating (e.g., polyurea coating) on the plug 114 and/or the seat ring 116. In other examples, the self-healing thermoset material 120 makes up a portion of and/or the entire seat ring 116. While the above-example describes the self-healing thermoset material 120 being on and/or part of the plug 114, in other configurations, the self-healing thermoset material 120 may be included on the seat ring 116. In some such examples, the plug 114 may include a relatively sharp engagement edge 122 that engages the seat ring 116 and/or the self-healing thermoset material 120 thereon. The self-healing thermoset material 120 is provided on the seat ring 116 in flow-to-open configurations and the self-healing thermoset material 120 is provided on the plug 114 in flow-to-close configurations to enable the self-healing thermoset material 120 from encountering direct contact with the fluid flow flowing through the fluid regulator 100, for example. As discussed above, the self-healing thermoset material 120 self-heals any cuts formed therein.

When the self-healing thermoset material 120 is coupled to the plug 114, a barrier may be formed on the plug 114 that prevents a suction force within the valve 106 from decoupling the self-healing thermoset material 120 from the plug 114. For example, the plug 114 may define a channel into which the self-healing thermoset material 120 is positioned (e.g., partially positioned, entirely positioned). In some examples, the self-healing thermoset material 120 may be recessed within the channel and spaced from an opening of the channel to further protect the self-healing thermoset material 120 from, for example, fluid flowing through the valve 106. However, in other examples, the self-healing thermoset material 120 may be substantially flush with the opening of the channel. Additionally or alternatively, to substantially ensure that the self-healing thermoset material 120 remains coupled to the plug 114 and/or within the channel, the self-healing thermoset material 120 may be glued, clamped or otherwise coupled to the plug 114. For example, surface structures (e.g., ridges, spikes, ribs, grooves, etc.) may be provided within the channel to substantially prevent the self-healing thermoset material 120 from being removed from the channel.

While the above-example describes the self-healing thermoset material 120 being applied to the plug 114 and/or the seat ring 116, the self-healing thermoset material 120 may be applied to different locations on the fluid regulator 100. For example, the passageway 108 may include a coating of the self-healing thermoset material 120 to assist in erosion and/or corrosion prevention.

Figure 2:
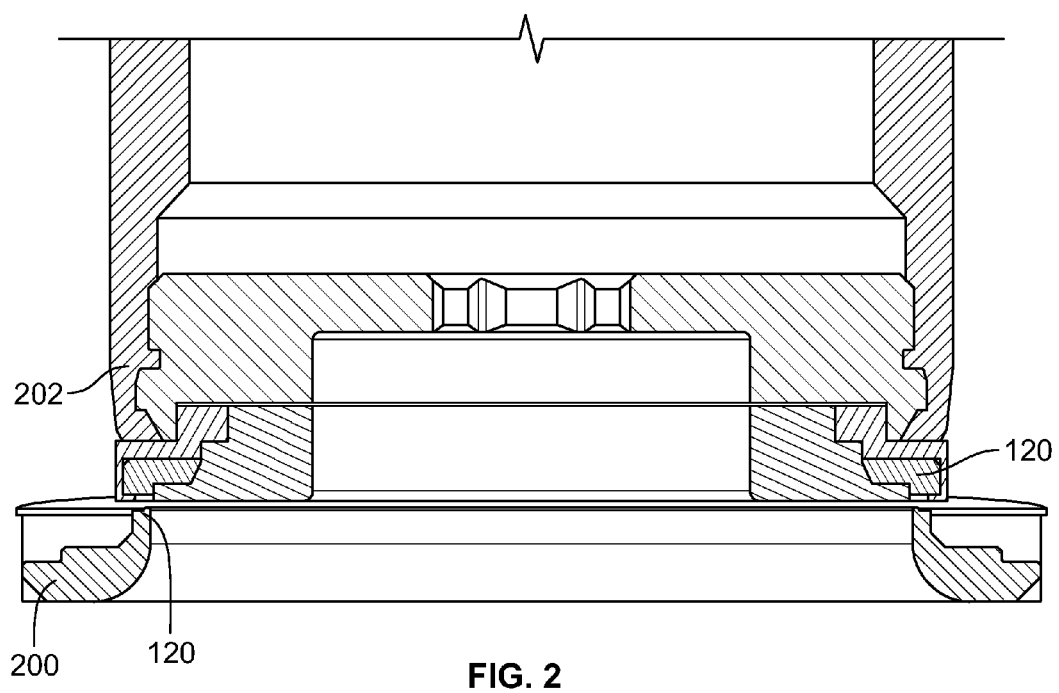
FIG. 2 shows a portion of an example plug and an example seat ring that can be used to implement the example fluid regulator of FIG. 1.

FIG. 2 depicts an example seat ring 200 and an example plug 202 that can be used to implement the fluid regulator 100 of FIG. 1. In this example, the self-healing thermoset material 120 is positioned on the plug 202 and/or the seat ring 200 to enable any cuts caused by the engagement between the seat ring 200 and the plug 202 to self-heal without an external stimulus.

Figure 3:
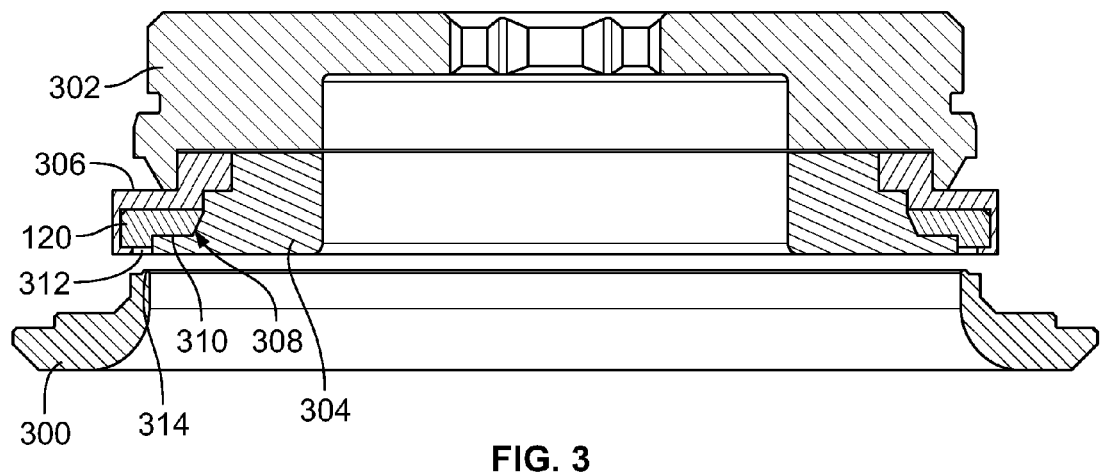
FIG. 3 shows a portion of another example plug and seat ring that can be used to implement the example fluid regulator of FIG. 1.

FIG. 3 depicts a seat ring 300 and a plug 302 that can be used to implement the fluid regulator 100 of FIG. 1. In this example, the plug 302 includes a first portion 304 and a second portion 306 that define a channel 308 into which the self-healing thermoset material 120 is positioned. In some examples, the first and second portions 304, 306 act as a clamp to retain the self-healing thermoset material within the channel 308. In some examples, surface structures (e.g., ridges, grooves, spikes, etc.) 310 may be positioned on surfaces that define the channel 308 to substantially ensure that the self-healing thermoset material 120 remains retained within the channel 308. In this example, the self-healing thermoset material 120 is spaced from an opening 312 of the channel 308 to substantially ensure that the self-healing thermoset material 120 is not affected by, for example, fluid flowing through the fluid regulator 100. In operation, the plug 302 engages the seat ring 300 to position a ridge 314 of the seat ring 300 through the opening 312 to engage the self-healing thermoset material 120. In this example, the engagement between the ridge 314 and the self-healing thermoset material 120 controls fluid flow through the fluid regulator 100.

Figure 4:
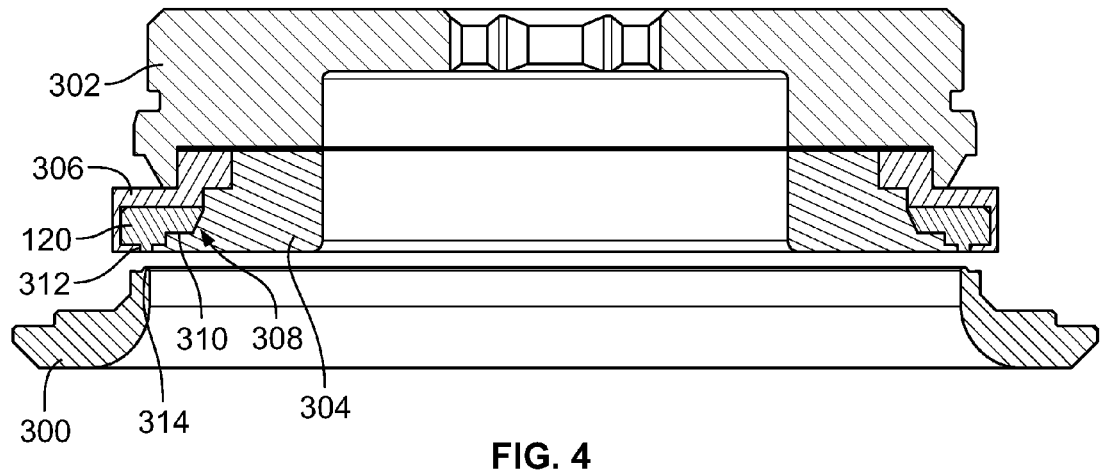
FIG. 4 shows a portion of another example plug and seat ring that can be used to implement the example fluid regulator of FIG. 1.

FIG. 4 depicts the example seat ring 300 and the example plug 302 that can be used to implement the fluid regulator 100 of FIG. 1. In contrast to the example shown in FIG. 3, the self-healing thermoset material 120 extends adjacent to and/or is substantially flush with the opening 312 of the channel 308.

Figure 5:
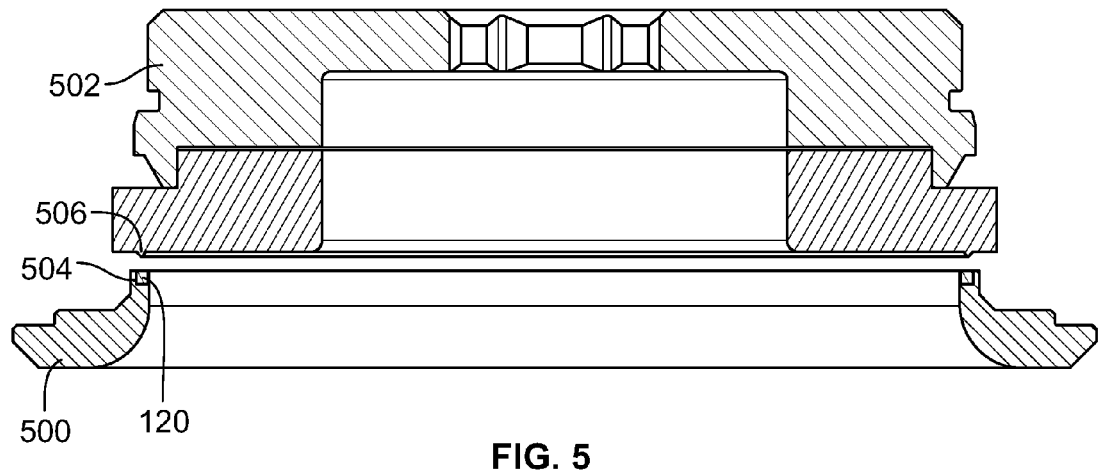
FIG. 5 shows a portion of another example plug and seat ring that can be used to implement the example fluid regulator of FIG. 1.

FIG. 5 depicts an example seat ring 500 and an example plug 502 that can be used to implement the fluid regulator 100 of FIG. 1. In this example, the seat ring 500 defines a channel 504 into which the self-healing thermoset material 120 is positioned. In some examples, the self-healing thermoset material 120 is coupled within the channel 504 by an interference fit and/or glue and/or surface structures (e.g., ribs, grooves, etc.) that define the channel 504. In operation, the plug 502 engages the seat ring 500 to urge a ridge 506 of the plug 502 into engagement with the self-healing thermoset material 120 to control fluid flow through the fluid regulator 100, for example.

Figure 6:
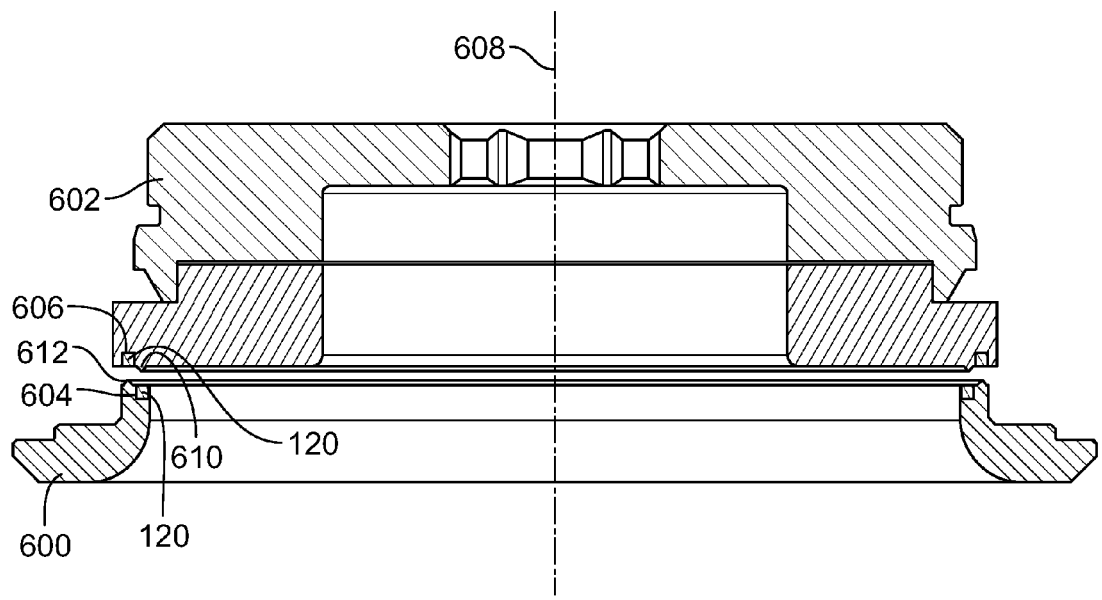
FIG. 6 shows a portion of another example plug and an example seat ring that can be used to implement the example fluid regulator of FIG. 1.

FIG. 6 depicts an example seat ring 600 and an example plug 602 that can be used to implement the fluid regulator 100 of FIG. 1. In this example, the seat ring 600 defines a first channel 604 into which the self-healing thermoset material 120 is positioned. Additionally, in this example, the plug 602 defines a second channel 606 into which the self-healing thermoset material 120 is positioned. While the first channel 604 of the seat ring 600 is shown as being positioned between the second channel 606 of the plug 602 and an axis 608 extending through the seat ring 600 and the plug 602, in other examples, the second channel 606 of the plug 602 may be positioned between the first channel 604 of the seat ring 600 and the axis 608. In operation, the plug 602 engages the seat ring 600 to urge a first ridge 610 of the plug 602 into engagement with the self-healing thermoset material 120 within the first channel 604 and to urge a second ridge 612 of the seat 600 into engagement with the self-healing thermoset material 120 within the second channel 606. The engagement between the ridges 610, 612 and the self-healing thermoset material 120 controls fluid flow through the fluid regulator 100, for example.

Figure 7:
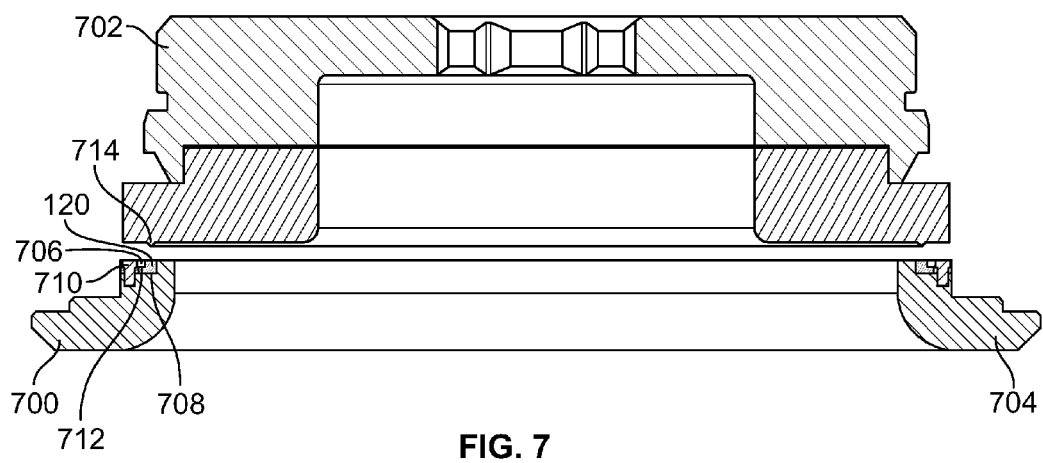
FIG. 7 shows a portion of another example plug and an example seat ring that can be used to implement the example fluid regulator of FIG. 1.

FIG. 7 depicts a seat ring 700 and a plug 702 that can be used to implement the fluid regulator 100 of FIG. 1. In this example, the seat ring 700 includes a first portion 704 and a second portion 706 that define a channel 708 into which the self-healing thermoset material 120 is positioned. In some examples, the first and second portions 704, 706 act as a clamp to retain the self-healing thermoset material within the channel 708. Specifically, a fastener 710 connects the first and second portions 704, 706 to secure the self-healing thermoset material 120 within the channel 708. However, the first and second portions 704, 706 may be coupled in any other suitable way (e.g., glue, screws, bolts, etc.). In some examples, surface structures (e.g., ridges, grooves, spikes, etc.) 712 may be positioned on surfaces that define the channel 708 to substantially ensure that the self-healing thermoset material 120 remains retained within the channel 708. In operation, the plug 702 engages the seat ring 700 to engage a ridge 714 of the seat ring 700 and the self-healing thermoset material 120. In this example, the engagement between the ridge 714 and the self-healing thermoset material 120 controls fluid flow through the fluid regulator 100.

As set forth herein, an example apparatus includes a seat ring for use with a fluid control device comprising a self-healing material. The self-healing material to self-heal without an external stimulus. In some examples, the self-healing material includes a self-healing thermoset elastomer. In some examples, the self-healing material includes a coating on the seat ring. In some examples, the apparatus includes an adhesive to couple the self-healing material to the seat ring. In some examples, the apparatus includes a clamp to couple the self-healing material to the seat ring. In some examples, the self-healing material comprises a permanently cross-linked poly(urea-urethane) elastomeric network. In some examples, the self-healing material is self-healing at room temperature. In some examples, the self-healing material includes a self-healing Polyurea material.

Another example apparatus includes a plug for use with a fluid control device comprising a self-healing material. The self-healing material to self-heals without an external stimulus. In some examples, the apparatus includes an adhesive to couple the self-healing material to the plug. In some examples, the apparatus includes a clamp to couple the self-healing material to the plug. In some examples, the self-healing material includes a permanently cross-linked poly(urea-urethane) elastomeric network. In some examples, the self-healing material includes a self-healing Polyurea material. In some examples, the self-healing material comprises a self-healing thermoset elastomer.

Another example apparatus includes a valve body, a seat ring, a plug movable relative to the seat ring to control fluid flow through the valve body and a self-healing material on one of the plug or the seat ring. The self-healing material to self-heal without an external stimulus. In some examples, the apparatus includes an adhesive to couple the self-healing material to the seat ring or the plug. In some examples, the apparatus includes a clamp to couple the self-healing material to the seat ring or the plug. In some examples, the self-healing material comprises a permanently cross-linked poly(urea-urethane) elastomeric network. In some examples, the self-healing material comprises a self-healing Polyurea material. In some examples, the self-healing material includes a self-healing thermoset elastomer.

An example method includes moving a plug of a fluid control device into engagement with a seat ring of the fluid control device, based on the engagement between the plug and the seat ring, forming a cut on a self-healing material on one of the plug or the seat ring and self-healing the cut without an external stimulus.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a seat ring for use with a fluid control device, the seat ring including a first seat ring portion and a second seat ring portion that, when coupled, form a channel spaced from a peripheral edge of the seat ring;
    a self-healing material disposed in the channel, the self-healing material being substantially flush or recessed relative to an adjacent surface of the seat ring to deter the self-healing material from being affected by fluid to flow through the fluid control device, the self-healing material to self-heal without an external stimulus; and
    a fastener received by the first seat ring portion and the second seat ring portion, the fastener being substantially flush or recessed relative to an adjacent surface of the seat ring, at least one of the fastener or the second seat ring portion including a lip or surface structures to retain the self-healing material within the channel.

2. The apparatus of claim 1, wherein the self-healing material comprises a self-healing thermoset elastomer.

3. The apparatus of claim 1, further comprising an adhesive disposed within the channel to couple the self-healing material to the seat ring.

4. The apparatus of claim 1, wherein the self-healing material comprises a permanently cross-linked poly(urea-urethane) elastomeric network.

5. The apparatus of claim 1, wherein the self-healing material is self-healing at room temperature.

6. The apparatus of claim 1, wherein the self-healing material comprises a self-healing Polyurea material.

7. The apparatus of claim 1, wherein the fastener includes a clamp including the lip.

8. The apparatus of claim 1, wherein the fastener includes a clamp and a threaded fastener, the threaded fastener to extend through or along the clamp to couple the self-healing material to the seat ring.

9. The apparatus of claim 8, wherein the clamp partially defines the channel.

10. The apparatus of claim 1, wherein the self-healing material is structured to be cut by a plug of the fluid control device and to self-heal the cut without an external stimulus.

11. The apparatus of claim 1, further including a plug including a rib, the plug being movable between a first position in which the rib is received within the channel and engages the self-healing material to form a seal between the plug and the seal-healing material and a second position in which the rib is spaced from the channel.

12. An apparatus, comprising:
    a plug for use with a fluid control device, the plug including a groove, a self-healing material filling in the groove of the plug, the self-healing material to self-heal without an external stimulus; and
    a seat ring for use with the fluid control device, the seat ring including a rib having an edge, when the fluid control device is in a closed position, the rib is structured to be received within the groove and the edge is structured to engage the self-healing material.

13. The apparatus of claim 12, further comprising an adhesive disposed within the groove to couple the self-healing material to the plug.

14. The apparatus of claim 12, wherein the self-healing material comprises a permanently cross-linked poly(urea-urethane) elastomeric network.

15. The apparatus of claim 12, wherein the self-healing material comprises a self-healing Polyurea material or a self-healing thermoset elastomer.

16. The apparatus of claim 12, further comprising surface structures disposed within the groove to retain the self-healing material within the groove.

17. The apparatus of claim 16, wherein the surface structures include one or more of ridges, spikes, or a rib.

18. The apparatus of claim 12, wherein the groove is a first groove, the rib is a first rib, and the edge is a first edge, wherein the plug includes a second rib having a second edge and the seat ring includes a second groove, a self-healing material filling the second groove, when the fluid control device is in the closed position, the second rib is structured to be received within the second groove and the second edge is structured to engage the self-healing material.

19. The apparatus of claim 12, wherein the plug includes a first plug portion and a second plug portion that, when coupled, form the groove having an opening facing the rib.

20. The apparatus of claim 12, further including a fastener removably coupled to the plug, the fastener including a lip to secure the self-healing material within the groove.

21. The apparatus of claim 20, wherein the fastener includes a clamp and a threaded fastener, the threaded fastener to extend through or along the clamp to couple the self-healing material to the plug.

22. The apparatus of claim 21, wherein the plug and the clamp define an opening of the groove to enable the self-healing material to be accessed within the groove and to enable the self-healing material to engage a seat ring of the fluid control device.

23. An apparatus, comprising:
a valve body;
a seat ring;
a plug movable relative to the seat ring to control fluid flow through the valve body;
a self-healing material clamped within a groove of one of the plug or the seat ring, the self-healing material to self-heal without an external stimulus, the other of the plug or the seat ring including a rib having an edge that is to engage the self-healing material when the plug engages the seat ring; and
a fastener extending into the one of the plug or the seat ring to couple the self-healing material to the one of the plug or the seat ring via a lip of the fastener.

24. The apparatus of claim 23, further comprising an adhesive within the groove to couple the self-healing material to the one of the seat ring or the plug.

25. The apparatus of claim 23, wherein the self-healing material comprises at least one of a permanently cross-linked poly(urea-urethane) elastomeric network, a self-healing Polyurea material, or a self-healing thermoset elastomer.

26. The apparatus of claim 23, wherein the self-healing material being clamped within the groove of the one of the plug or the seat ring enables a peripheral edge of the self-healing material to extend toward a surface of the one of the plug or the seat ring defining an opening of the groove.

27. The apparatus of claim 23, wherein the groove is a first groove and is defined by the plug, further including a second groove defined by the seat ring, the second groove offset relative to a longitudinal axis adjacent the first groove and filled with a self-healing material.

28. A method, comprising:
moving a plug of a fluid control device into engagement with a seat ring of the fluid control device;
based on the engagement between the plug and the seat ring, forming a cut on a self-healing material, the self-healing material disposed in a groove of one of the plug or the seat ring, a fastener being carried by the one of the plug or the seat ring, the fastener defining a side of the groove and including a lip to capture the self-healing material within the groove; and
self-healing the cut without an external stimulus.

* * * * *